US009893825B1

(12) United States Patent
Rao et al.

(10) Patent No.: US 9,893,825 B1
(45) Date of Patent: Feb. 13, 2018

(54) SYSTEM AND METHOD FOR SHARING PRESET RADIO STATIONS USING A WIRELESS NETWORK

(71) Applicant: Ford Global Technologies, LLC, Dearborn, MI (US)

(72) Inventors: Jayanthi Rao, West Bloomfield, MI (US); Cynthia M. Neubecker, Westland, MI (US); Pramita Mitra, Bloomfield Hills, MI (US); Jakob Nikolaus Hoellerbauer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/385,768

(22) Filed: Dec. 20, 2016

(51) Int. Cl.
| | | |
|---|---|---|
| *H04B 1/18* | (2006.01) | |
| *H04H 20/62* | (2008.01) | |
| *H04W 4/04* | (2009.01) | |
| *H04W 4/00* | (2018.01) | |
| *G06F 3/16* | (2006.01) | |

(52) U.S. Cl.
CPC ............ *H04H 20/62* (2013.01); *H04W 4/008* (2013.01); *H04W 4/046* (2013.01); *G06F 3/165* (2013.01)

(58) Field of Classification Search
CPC ........ H04H 60/46; H04H 60/47; H04H 60/51; H04H 60/65
USPC ..... 455/41.1, 41.2, 3.05, 3.06, 569.2, 556.1, 455/99, 297, 11.1, 345, 404.2, 408, 132, 455/230, 456.3, 185.1, 186.1, 179.1; 701/102, 1, 200, 211, 201; 709/223, 214, 709/205, 228, 201, 203; 726/1; 705/64, 705/21, 17; 381/15; 725/100, 81
See application file for complete search history.

(56) References Cited

U.S. PATENT DOCUMENTS

| | | | | |
|---|---|---|---|---|
| 7,116,939 | B1 * | 10/2006 | Kandler | H04B 1/082 455/3.01 |
| 8,676,920 | B2 * | 3/2014 | Bai | G06F 17/30902 709/205 |
| 8,682,956 | B2 * | 3/2014 | Bai | G06F 17/30029 709/201 |
| 8,977,408 | B1 * | 3/2015 | Cazanas | H04L 41/082 455/3.03 |
| 9,031,499 | B2 * | 5/2015 | Pandey | H04W 88/04 340/425.5 |

(Continued)

FOREIGN PATENT DOCUMENTS

CN 202444480 U 9/2012

*Primary Examiner* — Tan H Trinh
(74) *Attorney, Agent, or Firm* — James P. Muraff; Neal, Gerber & Eisenberg LLP

(57) ABSTRACT

Embodiments provide a vehicle comprising a wireless transceiver for transmitting a request for radio presets to a plurality of vehicles within a predetermined proximity of the vehicle; a processor for generating a list of local radio stations based on radio presets information received by the wireless transceiver and a user preference for prioritizing the stations; and an audio system for playing audio received from a selected one of the local radio stations. Embodiments also include a method in a vehicle comprising sending, via a wireless transceiver, a request for radio presets to a plurality of vehicles within a predetermined proximity of the vehicle; generating, using a processor, a list of local radio stations based on radio presets information received by the wireless transceiver and a user preference for prioritizing the stations; and playing, via an audio system, audio received from a selected one of the local radio stations.

20 Claims, 3 Drawing Sheets

(56) References Cited

U.S. PATENT DOCUMENTS

| | | | | |
|---|---|---|---|---|
| 2004/0093155 | A1* | 5/2004 | Simonds | H04L 67/12 701/532 |
| 2004/0116088 | A1* | 6/2004 | Ellis | H04B 1/20 455/132 |
| 2004/0198282 | A1* | 10/2004 | Heiderscheit | H03J 1/0075 455/186.1 |
| 2005/0282519 | A1* | 12/2005 | Kobayashi | G06Q 30/06 455/408 |
| 2006/0259931 | A1* | 11/2006 | Kikkoji | G11B 27/034 725/100 |
| 2007/0005164 | A1* | 1/2007 | Kuramoto | G11B 27/105 700/94 |
| 2007/0037534 | A1* | 2/2007 | Doudnikoff | G06Q 50/10 455/185.1 |
| 2007/0127726 | A1* | 6/2007 | Ellis | H04B 1/20 381/15 |
| 2010/0100310 | A1* | 4/2010 | Eich | G01C 21/3661 701/533 |
| 2010/0178938 | A1* | 7/2010 | Ingrassia, Jr. | H04H 60/65 455/456.3 |
| 2010/0267331 | A1* | 10/2010 | Ingrassia | H04H 20/26 455/3.04 |
| 2010/0280956 | A1* | 11/2010 | Chutorash | G06Q 20/20 705/64 |
| 2010/0285763 | A1* | 11/2010 | Ingrassia | H04H 20/08 455/185.1 |
| 2012/0202443 | A1* | 8/2012 | Jotanovic | H04H 60/33 455/186.1 |
| 2013/0198802 | A1* | 8/2013 | Ricci | H04L 63/10 726/1 |
| 2013/0219039 | A1* | 8/2013 | Ricci | H04L 43/0876 709/223 |
| 2014/0018006 | A1* | 1/2014 | Petrucci | H04H 60/51 455/66.1 |
| 2014/0129113 | A1* | 5/2014 | Van Wiemeersch | F02D 28/00 701/102 |
| 2014/0302774 | A1* | 10/2014 | Burke | H04H 20/57 455/3.05 |
| 2015/0220991 | A1* | 8/2015 | Butts | G06Q 30/0265 705/14.62 |
| 2015/0263771 | A1* | 9/2015 | Bakhri | H04W 4/046 455/200.1 |
| 2016/0013823 | A1* | 1/2016 | Grover | H04H 60/46 455/158.2 |
| 2016/0211932 | A1* | 7/2016 | Schmauderer | H04H 20/57 |
| 2017/0104824 | A1* | 4/2017 | Bajwa | H04W 4/025 |

* cited by examiner

SYSTEM AND METHOD FOR SHARING PRESET RADIO STATIONS USING A WIRELESS NETWORK

TECHNICAL FIELD

This application generally relates to preset radio stations stored in a vehicle and more specifically, to sharing preset radio stations between vehicles using a wireless communications network.

BACKGROUND

Many vehicle audio systems provide users with the option to save frequently-used or preferred radio stations as "presets," or stored radio stations that can be easily or quickly accessed using one or more inputs of the audio system (e.g., depressible buttons or "soft keys"). As an example, a typical audio system may have six presets, or memory locations, for AM radio stations and twelve presets for storing FM radio stations. Upon selection of a given preset radio station, a radio receiver included in the audio system is automatically tuned to the AM or FM radio frequency band associated with the selected station, and an audio signal broadcast by the station is played by the audio system through one or more speakers included in the vehicle.

In most cases, radio station presets are useful only if the vehicle remains within a broadcast range of each station. Once the vehicle travels outside this range, for example, to a new geographical area, the audio broadcast by the corresponding preset radio station may no longer be accessible and/or may be replaced with audio being broadcast by another radio station within the new geographical area. Thus, the vehicle's preset radio stations may become obsolete as the vehicle travels to distant locations.

When traveling, the vehicle operator can try to search for new radio stations using the radio tuner and manually re-program the radio station presets with any newly discovered radio stations. However, this manual re-programming process can be tedious, time-consuming, and frustrating, especially when there are a large number of unfamiliar radio stations to sift through in a given area. Some vehicle audio systems include an auto-programming feature that automatically assigns accessible radio stations to each preset, or memory location. While this feature may be used to quickly re-program stored presets with new radio stations, existing auto-programming software does not take into account user preferences or tastes (e.g., preferred radio station genre(s)) or other factors that may be used by the vehicle operator, herself, when selecting certain radio stations over others. For example, such software typically selects, as presets, the first twelve FM radio stations and the first six AM radio stations that have sufficient broadcast strength at the vehicle's current location.

Accordingly, there is still a need in the art for an improved vehicle audio system for identifying relevant local radio stations while traveling through a new geographical area.

SUMMARY

The invention is intended to solve the above-noted and other problems by providing systems and methods designed to identify local radio stations based on the preferences of a vehicle operator and preset radio station information received from a plurality of nearby vehicles and/or roadside infrastructure using a wireless communications network, such as, for example, a dedicated short range communication (DSRC) network.

For example, one embodiment provides a vehicle comprising a wireless transceiver for transmitting a request for radio presets to a plurality of vehicles within a predetermined proximity of the vehicle; a processor for generating a list of local radio stations based on radio presets information received by the wireless transceiver and a user preference for prioritizing the stations; and an audio system for playing audio received from a selected one of the local radio stations.

Another example embodiment provides a method in a vehicle comprising sending, via a wireless transceiver, a request for radio presets to a plurality of vehicles within a predetermined proximity of the vehicle; generating, using a processor, a list of local radio stations based on radio presets information received by the wireless transceiver and a user preference for prioritizing the stations; and playing, via an audio system, audio received from a selected one of the local radio stations.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
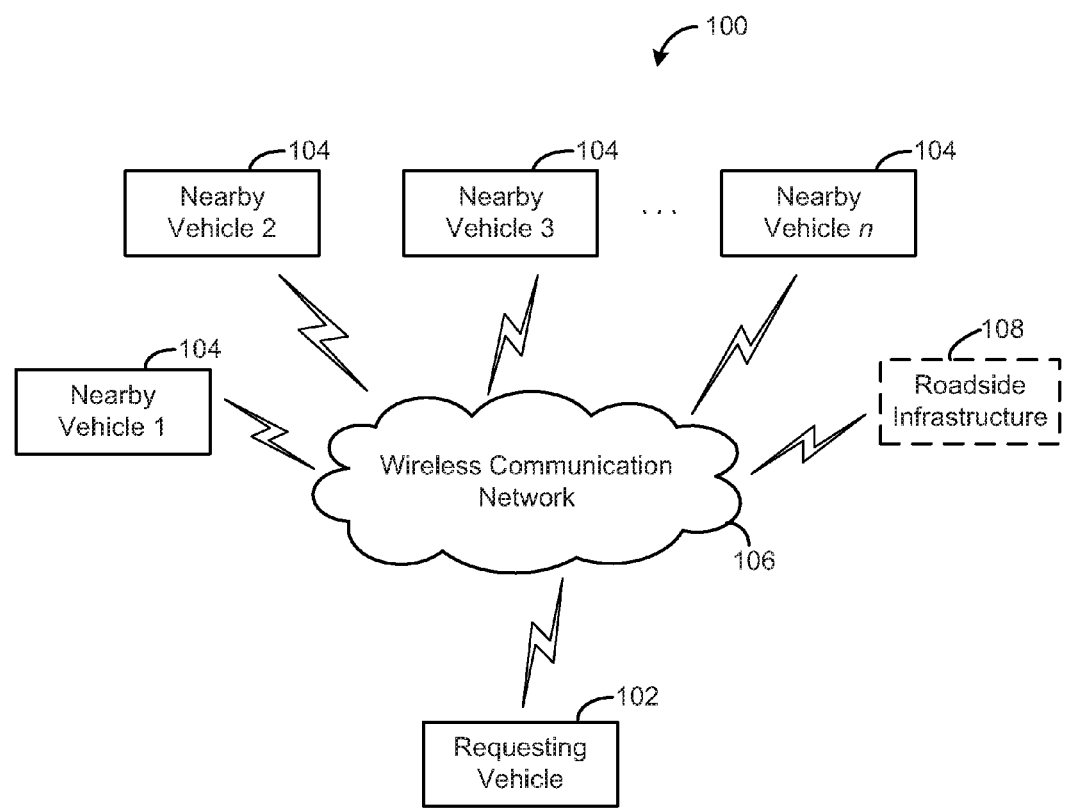
FIG. 1 is an illustration of an example environment for identifying local radio stations using a wireless communication network, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Certain embodiments disclosed herein utilize dedicated short range communications (DSRC) technology to provide, to a requesting vehicle, preset radio station information stored by a plurality of nearby vehicles and/or roadside infrastructure. As used herein, DSRC refers to a two-way, short-range or medium-range wireless communications technology that is designed for automotive use to exchange a wide range of information in both vehicle-to-vehicle (V2V) applications and vehicle-to-infrastructure (V2I) applications (e.g., government infrastructure). For example, DSRC technology has been proposed for use in a number of roadside applications, including improve traffic safety, provide accident reports, convey approaching emergency vehicle warnings and/or sudden braking ahead warnings, and accept electronic parking and toll payments. Because the DSRC range is relatively short (e.g., 100-1000 meters), DSRC infrastructure (or roadside units) will be widely and densely deployed at intersections and along roadways within a given metropolitan area in order to facilitate communication across the entire area and form a robust DSRC network. Compared to other wireless technologies (e.g., WiFi, satellite, Near Field Communication (NFC), Bluetooth, etc.), DSRC technology can permit secure, reliable communications directly between vehicles, or between vehicles and roadside units (e.g., over a dedicated communications channel), and can be used to conduct point-to-point wireless communications (e.g., wireless messages directed at a specific vehicle or roadside unit), as well as to broadcast wireless messages to all vehicles and roadside units within a limited broadcast area. In the United States, DSRC is allocated for high frequency radio transmission, for example, in a dedicated 75 MHz spectrum band around 5.9 GHz.

FIG. 1 illustrates an example environment 100 for identifying local radio stations using wireless communications between a requesting vehicle 102 and a plurality of neighboring or nearby vehicles 104, in accordance with embodiments. The nearby vehicles 104 can be any vehicle that is within a predetermined proximity of the vehicle 102, such as, for example, a broadcast range of a wireless transceiver included in the vehicle 102. As shown, each of the requesting vehicle 102 and the nearby vehicles 104 can be configured to communicate with each other through a wireless communication network 106. In some cases, the environment 100 also includes roadside infrastructure 108 configured to communicate with the requesting vehicle 102 via the wireless communication network 106, so long as the infrastructure 108 is within the broadcast range of the requesting vehicle 102 (or vice versa).

Figure 2:
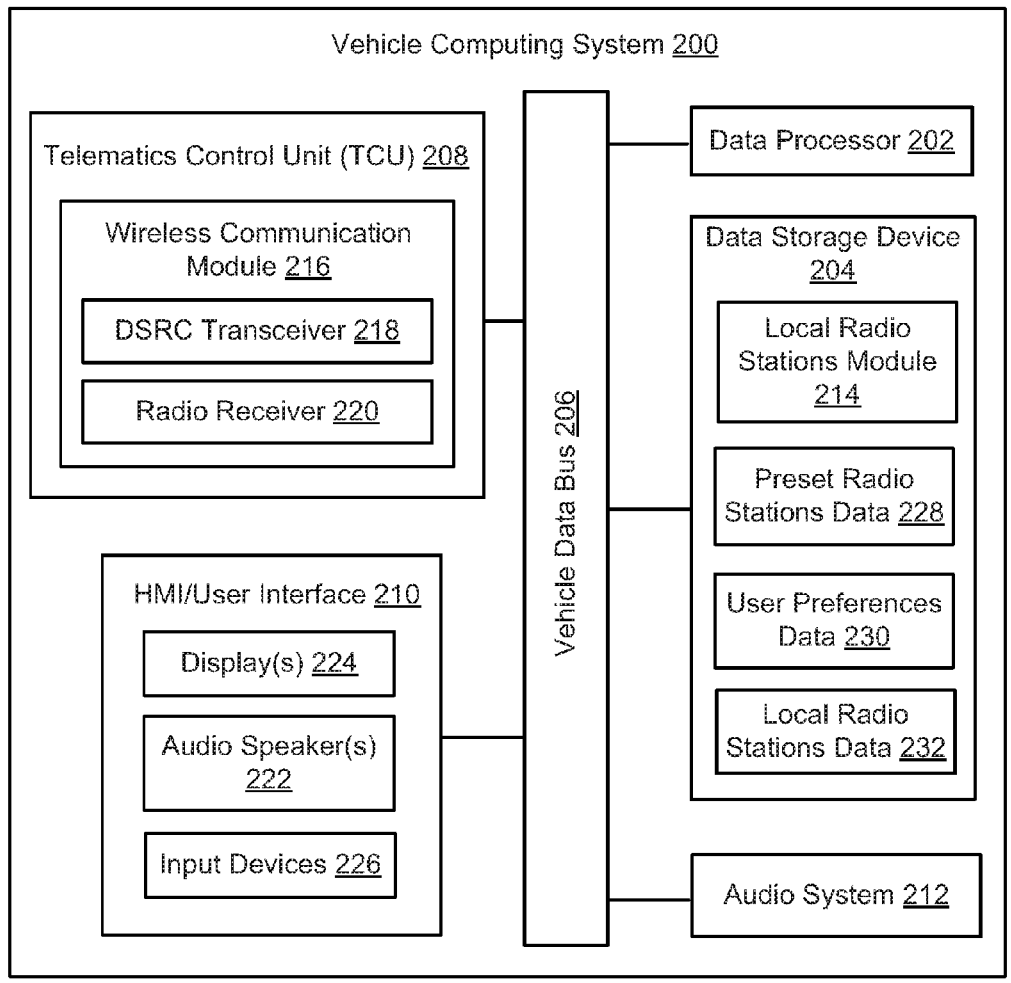
FIG. 2 is a block diagram of an example vehicle computing system included in one of the vehicles of the environment shown in FIG. 1, in accordance with certain embodiments.

In embodiments, the requesting vehicle 102 has a plurality of preset radio stations stored in a memory of the vehicle 102 (such as, e.g., data storage device 204 shown in FIG. 2). The preset radio stations may be configured using a user interface of the vehicle (such as, e.g., user interface 210 shown in FIG. 2) and in association with an audio system of the vehicle (such as, e.g., audio system 212 shown in FIG. 2). For example, a vehicle operator may interact with the user interface in order to save a given radio station as a preset radio station (e.g., by holding down a corresponding preset button). The operator may also interact with the user interface to select a given preset radio station for listening purposes (e.g., by tapping a corresponding preset button). In response to said selection, the audio system can play audio broadcast by the selected station. The number of preset radio stations stored in the vehicle 102 can depend on the number of memory locations reserved for radio presets. In one example embodiment, the vehicle 102 has twelve presets for FM radio stations and six presets for AM radio stations.

As will be appreciated, each radio station can have a predetermined broadcast range or geographical reach. When traveling long distances, the vehicle 102 may move out of the broadcast range of a first set of radio stations and into the broadcast range of a second set of radio stations. For example, as the vehicle 102 travels away from the vehicle operator's home city, existing preset radio stations may no longer be available or reachable. The techniques described herein help identify available radio stations in new geographical areas by requesting neighboring vehicles 104 and/or infrastructure 108 to share their own preset radio stations with the vehicle 102. The requesting vehicle 102, in turn, analyzes the received radio presets information in light of certain criteria, including user-selected preferences, and selects a group of local radio stations for presentation to the user via the user interface and/or for re-programming existing presets stored in the vehicle 102. For example, the user preferences may include prioritizing the local radio stations identified by the received radio presets information based on a popularity of each radio station and/or based on genre information associated with each station.

In embodiments, the requesting vehicle 102 can comprise a vehicle computing system (such as, e.g., vehicle computing system (VCS) 200 shown in FIG. 2) configured to request radio presets information from the nearby vehicles 104 and/or infrastructure 108 and receive the requested information from each. The vehicle computing system can also be configured to enable a driver or vehicle operator to enter user preferences via a user interface of the vehicle 102 (such as, e.g., user interface 210 shown in FIG. 2), to generate a list of local radio stations based on the user preferences and the radio presets information received in response to the request via a processor of the vehicle 102 (such as, e.g., data processor 202 shown in FIG. 2), and to play audio transmitted or broadcast by a selected one of the local radio stations via an audio system of the vehicle 102 (such as, e.g., audio system 212 shown in FIG. 2). In some embodiments, the vehicle 102 can be configured to periodically re-send the request for radio presets information, so that the vehicle 102 receives up-to-date radio presets information while traveling to new geographical areas. In other embodiments, the requesting vehicle 102 can be configured to send a new request for radio presets information upon detecting low signal strength or diminishing signal quality for one or more of the local radio stations currently stored in the memory of the vehicle 102.

Each of the nearby vehicles 104 may also include a vehicle computing system (VCS) that is configured to wirelessly receive the request for radio presets from the requesting vehicle 102 and wirelessly transmit a response to the vehicle 102 comprising the requested information. For example, each of the nearby vehicles 104 may store a plurality of preset radio stations in a memory of the vehicle 104. In response to receiving the request, each vehicle 104 may generate, using a processor of the vehicle 104, a message comprising a list of the preset radio stations, as well as other information related to each station, such as, for example, a radio frequency band allocated to each station, a genre associated with each station, "now playing" information indicating the title of a currently playing song, and/or any other available information. In addition, each nearby vehicle 104 may include a wireless transceiver for wirelessly communicating with the requesting vehicle 102 via the wireless communication network 106 so long as the vehicle 102 is within a broadcast rage of the wireless transceiver (or vice versa). In some embodiments, each nearby vehicle 104 may also be configured to send requests for radio presets information to surrounding vehicles, including the other nearby vehicles 104 and/or the requesting vehicle 102. In such cases, each vehicle 104 may include a VCS similar to the VCS 200, and upon sending a request for radio presets, may function like the requesting vehicle 102.

The roadside infrastructure 108 may include, for example, a plurality of communication towers or roadside units (also known as "base stations") positioned at various locations along one or more roads (e.g., streets, avenues, boulevards, highways, etc.), at one or more intersections of said roads, and/or at one or more destinations (such as, e.g., houses, buildings, points of interest, etc.). Each roadside unit may include a computing device comprising a wireless transceiver configured to facilitate wireless communication with the requesting vehicle 102 and/or the nearby vehicles 104, as well as a remote server (not shown) associated with the infrastructure 108. In some cases, the computing device of each roadside unit may be configured to obtain local radio station information from the remote server and/or the nearby vehicles 104, store the information in a memory, and provide said information to the requesting vehicle 102 upon receiving a query therefrom. In other cases, each roadside unit may be configured to generally broadcast the local radio station information to the vehicle 102, and any other vehicles within a wireless communication range of the wireless transceiver included in the unit, without waiting for the request.

The wireless communication network 106 may utilize one or more types of wireless communication technology to carry out the communications described herein. For example, the wireless communication network 106 may include or utilize a digital cellular network, a Bluetooth connection, wireless LAN, infrared, radio frequency identification (RFID), near field communication (NFC), etc. In a preferred embodiment, the wireless communication network 106 includes a dedicated short range communication (DSRC) network, or any other network that can provide very high data transmission, low latency, and reliable performance at high vehicle speeds and in extreme weather conditions. In such cases, each of the vehicles 102 and 104 and the roadside infrastructure 108 includes a DSRC transceiver to facilitate communications via the DSRC network 106.

In some embodiments, the vehicle 102 generally broadcasts the request for radio presets information via the wireless communication network 106 and the request is received by any nearby vehicle 104 and/or unit of the roadside infrastructure 108 that is within a broadcast range (or predetermined proximity) of the vehicle 102 (e.g., 100 to 1000 meters). In some such cases, the roadside infrastructure 108 can be configured such that only the roadside unit that is closest to a current location of the requesting vehicle 102 responds to the vehicle's request. In other cases, the infrastructure 108 may apply one or more selection rules to determine which of the roadside units will respond to the request. In other embodiments, the requesting vehicle 102 first pings all nearby vehicles 104 and the roadside infrastructure 108 via the wireless communication network 106, and then waits for a response from each vehicle 104 or roadside unit that is able and willing to provide radio presets information to the vehicle 102. The vehicle 102 can then use point-to-point communication to transmit the request for radio presets to each responding vehicle 104 or roadside unit.

Referring now to FIG. 2, shown is an example vehicle computing system (VCS) 200 that may be included in the requesting vehicle 102 and/or one or more of the nearby vehicles 104. For example, the VCS 200 may be part of a vehicle electronics system or an infotainment system of the vehicle 102/104, such as the SYNC® system manufactured by FORD MOTOR COMPANY®. Other embodiments of the VCS 200 can include different, fewer, or additional components than those described below and shown in FIG. 2. In some embodiments, each of the vehicles 102 and 104 can include the VCS 200 and be configured to carry out the operations described herein, such that any of the vehicles 104 may become the vehicle requesting radio presets information and the requesting vehicle 102 may become one of the nearby vehicles sharing or supplying radio presets information.

As illustrated, the VCS 200 comprises a data processor 202 (e.g., an electronic data processor), a data storage device 204, and a vehicle data bus 206. The VCS 200 can further include various electronic control units (ECUs) responsible for monitoring and controlling the electrical systems or subsystems of the vehicle 102/104. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 200 include a telematics control unit 208, a human machine interface (HMI) or user interface 210, and a vehicle audio system 212. Though not shown, the VCS 200 may include other ECUs, such as, for example, a body control module (BCM) for controlling and monitoring various electronic accessories in a body of the vehicle 102/104 and a powertrain control module for controlling and monitoring an engine and transmission of the vehicle 102/104.

The ECUs of the VCS 200 are interconnected by the vehicle data bus 206 (such as, e.g., a controller area network (CAN) bus or an automotive Ethernet bus), which passes data to and from the various ECUs, as well as other vehicle and/or auxiliary components in communication with the VCS 200. Further, the data processor 202 can communicate with any one of the ECUs and the data storage device 204 via the data bus 206 in order to carry out one or more functions, including the functions associated with a local radio stations module 214.

The data processor 202 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 200 can comprise a general purpose computer that is programmed with various programming instructions or modules stored in the data storage device 204 (such as, e.g., the network navigation module 214) or elsewhere.

The telematics control unit (TCU) 208 can be an ECU for enabling the vehicle 102/104 to connect to one or more wireless networks, such as, for example, WiFi, cellular, Bluetooth, NFC, RFID, satellite, DSRC, and infrared. In embodiments, the TCU 208 includes a wireless communication module 216 comprising one or more antennas, radios, modems, receivers, transmitters, and/or transceivers (not shown) for connecting to, or interfacing with, the various wireless networks. In a preferred embodiment, the wireless communication module 216 includes a DSRC transceiver 218 for wirelessly communicating with other vehicles 104/102 and/or roadside infrastructure 108 over the DSRC network. In other embodiments, the wireless communication module 216 can also include a mobile communication unit (not shown) for wirelessly communicating with other vehicles 104/102 and/or roadside infrastructure 108 over a cellular network (e.g., GSM, GPRS, LTE, 3G, 4G, CDMA, etc.), an 802.11 network (e.g., WiFi), a WiMax network, and/or a satellite network.

In embodiments, the TCU 208 receives external data, including radio presets information, from the nearby vehicles 104 and/or the roadside infrastructure 108 via the wireless communication module 216 and/or the DSRC transceiver 218, and provides the external data to the data processor 202, the data storage device 204, the user interface 210, the audio system 212, or any other appropriate component of the VCS 200. For example, when the TCU 208 receives radio presets information from the nearby vehicles 104, the TCU 208 sends the information to the data processor 202, via the vehicle data bus 206, for processing in accordance with the local radio stations module 214. In addition, the TCU 208 transmits internal data, including a request for radio presets, to the nearby vehicles 104 and/or the roadside infrastructure 108 via the wireless communication module 216 and/or the DSRC transceiver 218. The TCU 208 may receive the internal data from the data processor 202, the data storage device 204, the user interface 210, or other component of the VCS 200.

As shown in FIG. 2, the TCU 208 further includes a radio receiver 220 for receiving audio signals (e.g., songs or other music, newscasts or other spoken word, etc.) broadcast by one or more radio stations. The radio receiver 220 can be part of the audio system 212, or at least coupled to the audio system 212. The audio system 212 can be configured to play the audio signals received by the radio receiver 220 through one or more audio speakers 222. The radio receiver 220 may also be referred to as a "tuner" and can include one or more control inputs for adjusting or tuning the radio receiver 220 to a specific frequency. As will be appreciated, each radio station is assigned a unique radio frequency band and/or channel and has a predetermined wireless transmission range (e.g., geographical radius). The radio receiver 220 can receive broadcasts from a given radio station by tuning the radio receiver 220 to the radio frequency band assigned to that station, as long as the radio receiver 220, or the vehicle 102/104, is within the wireless transmission range of the radio station. In some cases, the radio receiver 220 may be an AM/FM tuner that includes an AM radio for listening to AM radio stations and an FM radio for listening to FM radio stations. In such cases, the audio system 212 may include one or more control inputs for selecting either the AM radio or the FM radio, in addition to control inputs for tuning the radio receiver 220 to a specific frequency.

In some embodiments, the radio receiver 220 can be configured to measure a signal strength of a given radio station and determine whether the signal strength is too low for proper wireless reception at the radio receiver 220 or is otherwise subject to degraded signal quality. For example, the radio receiver 220 may detect a low signal strength for one of the local radio stations once the vehicle 102 travels out of a broadcast radius (or wireless transmission range) of that station. Upon detecting the low signal strength, the radio receiver 220 may send a notification to the processor 202, the audio system 212, the TCU 208, or the local radio stations module 214 indicating the unavailability of the local radio station and/or the need to send out a new request for radio presets.

According to embodiments, the user interface 210 (also known as a human-machine interface (HMI)) can be an ECU for enabling user interaction with the vehicle 102/104 and for presenting vehicle information to the vehicle operator or driver. The user interface 210 can be configured to interact with other ECUs of the vehicle 102/104, including the audio system 212 and the TCU 208, the data storage device 204, and/or the data processor 202, via the data bus 206, in order to provide information or inputs received via the user interface 210 to an appropriate component of the VCS 200 and to present, to the vehicle operator, information or outputs received from the various components of the VCS 200.

As shown, the user interface 210 may include one or more audio speakers 222, one or more displays or display screens 224, and a plurality of input devices 226, as well as various other devices for inputting, entering, receiving, capturing, displaying, or outputting data associated with the VCS 200, the local radio stations module 214, and/or the techniques disclosed herein. According to embodiments, the input devices 226 can include, for example, one or more of a keyboard, keypad, pointing device (e.g., electronic or optical mouse), button or push button, slider, switch, knob, dial, touch input device, microphone, and any other type of control input.

In some embodiments, the user interface 210 includes an instrument panel (IP) (not shown) positioned in a dashboard of the vehicle 102/104 for housing instrumentation and controls for operation of the vehicle, such as, e.g., a steering wheel and various gauges (e.g., speedometer, odometer, fuel gauge, etc.), as well as vehicle indicators, such as, e.g., gear selector position, seat belt warnings, etc. In some cases, at least one of the displays 224 is a display screen of the instrument panel (also referred to herein as an "IP display") for electronically or digitally displaying the various gauges, or values related thereto, the various vehicle indicators, and other vehicle information. In some embodiments, one or more of the input devices 226 is included in, or configured to control, the instrument panel (also referred to herein as "IP inputs").

In some embodiments, the one or more display(s) 224 includes a media display screen (not shown) that is separate from the instrument panel and is configured to display additional vehicle information, such as, e.g., information related to the audio system 212, video captured by an external vehicle camera (not shown), heating and air-conditioning information, navigation information, etc. In such cases, one or more of the input devices 226 can be configured to control data displayed via the media display screen (also referred to herein as "media inputs").

In embodiments, though not shown, the vehicle audio system 212 includes, in addition to the radio receiver 220, an amplifier for driving an audio signal to the audio speakers 222, or other audio output devices, and one or more media devices (e.g., tape player, CD player, DVD player, satellite radio, auxiliary devices, etc.). In some embodiments, the audio system 212 forms part of a pre-installed infotainment system or other original equipment manufacturer (OEM) system of the vehicle 102/104. In other embodiments, the audio system 212 comprises a head unit that is installed in the vehicle 102/104 after-market, for example, by coupling the head unit to the vehicle audio speakers and other OEM components of the VCS 200.

One or more components of the user interface 210 can be included in the audio system 212. For example, in one embodiment, at least one of the displays 224 (e.g., an audio display or the media display screen), at least one of the audio speakers 222, and one or more of the input devices 226 (also referred to herein as "audio inputs") can form part of, or be integrated into, the audio system 212 in order to enable user interaction with the audio system 212 and playback of audio signals produced by, or received at, the audio system 212. In such cases, the audio display 222 may display media information (e.g., radio station number and/or name, radio preset number, a list of preset radio stations, track name, track number, artist name, time remaining, time elapsed, etc.) and/or current setting information (e.g., volume level, equalization level(s), fade and balance levels, media mode (e.g., AM/FM radio, CD, Line-In, etc.), etc.) of the audio system 212.

Likewise, the audio input devices 226 may include dials (e.g., radio tuner dials, volume dial, etc.), switches, knobs, buttons, and/or touch inputs, for controlling various features and options of the audio system 212, such as, for example, power, play, next, fast-forward, rewind, back, search, stop, skip, etc., as well as features and options specific to operation of the radio receiver 220, such as, for example, programming radio presets, selecting a preset radio station for current listening, selecting AM or FM radio, tuning the radio receiver 220 to a specific frequency or radio station, etc. In some embodiments, the audio input devices 226 include designated input devices (e.g., preset buttons or touch inputs 1 through 12) for selecting and saving preset radio stations. For example, holding preset button 1 for a long period amount of time (e.g., more than two seconds) may cause a currently-playing radio station to be saved as "preset radio station 1" in a first memory location, and so on. As another example, tapping or holding a given preset button for a short period of time (e.g., less than one second) may cause the radio receiver 220 to be tuned to the radio frequency band of the radio station assigned to that preset location.

In embodiments, the preset radio stations assigned to each preset button may be stored in the data storage device 204, for example, as preset radio stations data 228, as shown in FIG. 2, or in a separate memory of the audio system 212. In some embodiments, the preset radio stations data 228 further includes genre information for each radio station included therein. For example, each preset radio station may be classified as being associated with a musical genre (such as, e.g., rock, country, hip-hop, indie, classical, etc.), a topical genre (such as, e.g., news, weather, traffic, cars, home improvement, law, medicine, politics, etc.), or any other type of genre for categorizing the content broadcast by the preset radio station.

In embodiments, the user interface 210 can be further configured to enable user selection or entry of one or more preferences or settings for controlling operation of the local radio stations module 214 or otherwise selecting local radio stations. For example, one or more of the audio input devices 226 and/or the media display 224 may be used to select criteria for prioritizing a list of local radio stations included in the radio presets information received from the nearby vehicles 104 and/or the roadside infrastructure 108. The selected criteria may be saved in the data storage device 204 as user preferences data 230, as shown in FIG. 2, or in a separate memory of the audio system 212. In some embodiments, for example, the user interface 210 is configured to present at least two user-selectable options (not shown) for prioritizing the list of local radio stations. The first option may include prioritizing the list of local radio stations based on a popularity of each station among the plurality of vehicles 104 and/or the roadside infrastructure 108. For example, upon selection of the first option, each of the local radio stations may be ranked based on how many of the nearby vehicles 104 are listening to that station or have that same station saved as a preset. The second option may include prioritizing the list of local radio stations based on genre information associated with the existing preset radio stations. For example, upon selection of the second option, the local radio stations may be sorted or categorized based on genre and then filtered based on the genres of the existing preset radio stations, so that only the local radio stations that match the genres of the existing presets remain. In some cases, the user interface may present a third option that includes prioritizing the list of local radio stations based on both genre and popularity. For example, upon selection of the third option, the local radio stations may be filtered to only include the stations that match genres of the existing preset radio stations and sorted into genre categories, and then the local radio stations within each genre may be ranked based on popularity.

In embodiments, the user interface 210 can be configured to present the radio presets information received from the nearby vehicles 104 and/or the roadside infrastructure 108 to a vehicle operator. For example, in some cases, the received radio presets information may be presented, on the media display 224, as a prioritized list of local radio stations (e.g., after applying the criteria stored in the user preferences data 230). In such cases, one or more audio input devices 226 can be configured to enable user control or selection of the presented local radio stations. For example, in some embodiments, the vehicle operator can use the user interface 210 to save one or more of the local radio stations in place of existing preset radio stations, save one or more of the local radio stations as "temporary presets," and/or select one of the local radio stations for listening purposes. In some embodiments, each radio station may be presented on the media display 224 with corresponding radio station number, genre information, "now playing" information (e.g., title of currently-playing song), and/or other information included in the radio presets information received by the TCU 208.

The data storage device 204 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 204 stores various pieces of data or information associated with the local radio stations module 214, the audio system 212, and/or the techniques described herein. For example, the data storage device 204 stores preset radio stations data 228 and user preferences data 230, as described herein.

In addition, the data storage device 204 may store local radio stations data 232. The local radio stations data 232 can include all or portions of the radio presets information received by the TCU 208 from the nearby vehicles 104 and/or the roadside infrastructure 108 in response to a request for radio presets. For example, in some embodiments, the local radio stations data 232 includes a list of local radio stations generated based on the received radio presets information and prioritized or filtered according to the user preferences data 230 also stored in the data storage device 204. In some cases, the data storage device 204 may temporarily store the local radio stations data 232, for example, until the vehicle 102 travels to a new geographical area or outside the wireless transmission range of the local radio stations included in the data 232. In other cases, the data storage device 204 may store the local radio stations data 232 for a longer term, for example, to allow future retrieval of the data 232 for the next time the vehicle operator wishes to travel to the same area.

In addition, the data storage device 204 stores one or more software program modules or software instructions, including the local radio stations module 214, for execution by the data processor 202. According to embodiments, the local radio stations module 214 is configured or adapted to generate a request for radio presets information and send the request to the TCU 208 for transmission to the nearby vehicles 104 and/or the roadside infrastructure 108; generate a list of local radio stations by applying user preferences data 230, retrieved from the data storage device 204, to the radio presets information received from the TCU 208 in response to the request; and provide the list of local radio stations to the user interface 210 and/or the audio system 212, so that the audio system 212 can play audio broadcast by a selected one of the local radio stations. In some embodiments, the local radio stations module 214 is also configured to receive a low signal strength notification from the radio receiver 220, for example, in response to the vehicle 102 moving out of a broadcast range of one or more local radio stations; and in response to this notification, provide a new request for radio presets information to the TCU 208 for transmission to the new group of vehicles and/or roadside infrastructure that are currently within a predetermined proximity of the vehicle 102.

Figure 3:
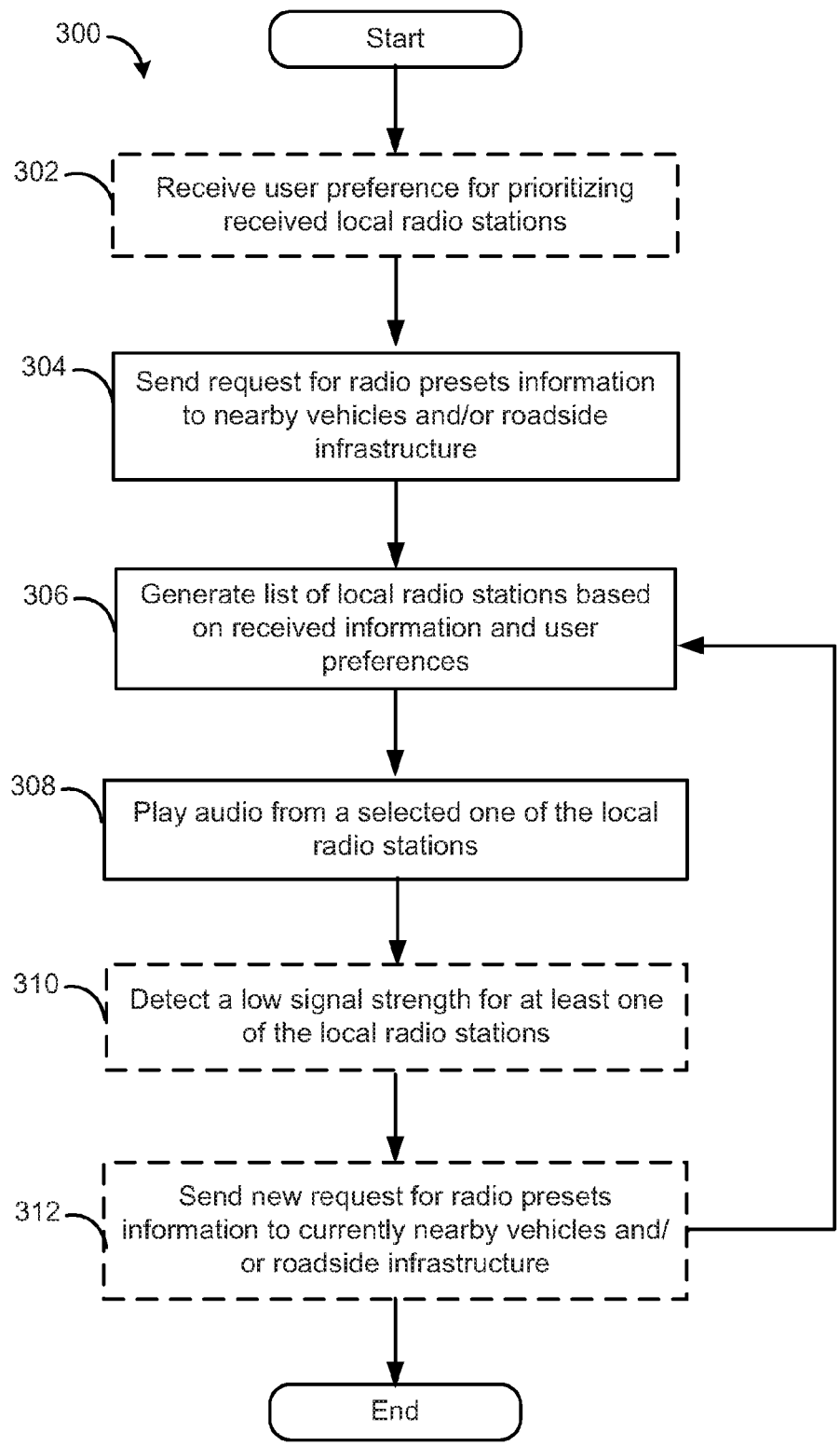
FIG. 3 is a flow diagram of an example method for identifying local radio stations using a wireless communication network, in accordance with certain embodiments.

FIG. 3 illustrates an example method 300 for identifying local radio stations using a wireless communication network, in accordance with embodiments. The method 300 can be carried out by a requesting vehicle, such as the vehicle 102 shown in FIG. 1, or more specifically, a vehicle computing system therein, such as the VCS 200 shown in FIG. 2. Further, the requesting vehicle can interact with one or more components of the environment 100 shown in FIG. 1, such as the plurality of nearby vehicles 104 and the roadside infrastructure 108, to carry out the operations of the method 300. In one embodiment, the method 300 is implemented, at least in part, by the data processor 202 executing software stored in the data storage device 204, such as the local radio stations module 214 shown in FIG. 2.

In some embodiments, the method 300 begins at step 302, where a processor of the vehicle receives a user preference for prioritizing a list of local radio stations received from nearby vehicles and/or roadside infrastructure. The user preferences can be entered or selected by the user through a user interface (such as, e.g., the user interface 210 shown in FIG. 2) of the vehicle and stored in a memory of the vehicle. In embodiments, the user preference may be selected between three user-selected options presented on the user interface: prioritizing the list of local radio stations based on a popularity of each radio station among the nearby vehicles and/or roadside infrastructure, prioritizing the list of local radio stations based on genre information associated with a set of preset radio stations stored in a memory of the vehicle, and prioritizing the list of local radio stations based on both genre and popularity. The received user preference may be stored in a memory of the vehicle (e.g., as user preferences data 230 shown in FIG. 2).

As shown in FIG. 3, the method 300 includes step 304, where the processor sends or transmits a request for radio presets information to nearby vehicles and/or roadside infrastructure using a telematics control unit (TCU) of the vehicle (such as, e.g., TCU 208 shown in FIG. 2), or more specifically a wireless transceiver included in the TCU (such as, e.g., DSRC transceiver 218 shown in FIG. 2). In embodiments, the processor may generate the request and send the request to the TCU 208 with instructions to transmit the request to nearby vehicles and/or roadside infrastructure within a broadcast range (e.g., 100 to 1000 meters) of the vehicle's wireless transceiver. In some embodiments, the request may be transmitted directly to one or more specific roadside units or vehicles using point-to-point communications. In other embodiments, the request may be broadcast to all roadside units within the broadcast range of the vehicle's wireless transceiver.

The radio presets information requested from each vehicle or unit can include an identification of each preset radio station stored in a memory thereof and/or in association with an audio system therein, including, for example a radio station number, frequency band, and/or name associated with the station. In some cases, the radio presets information further includes genre information, "now playing" information (such as, e.g., a title of the song that is currently being played by the station), or any other information available for each preset radio station. In some embodiments, the method 300 may also include receiving the radio presets information (not shown) from a plurality of the nearby vehicles and/or the roadside infrastructure via the wireless transceiver and storing the received information in a memory of the vehicle (e.g., as the local radio stations data 232 shown in FIG. 2).

The method 300 further includes step 306, where the processor generates a list of local radio stations based on the radio presets information received in response to step 304 and the user preference received at step 302. In embodiments, the processor generates the list of local radio stations by applying the user preference to the preset radio stations identified in the received radio presets information. As part of step 306, the processor may retrieve the user preference from the memory of the vehicle.

In embodiments, if the user preference is to prioritize or rank the list of local radio stations based on local popularity, the processor may determine which of the preset radio stations included in the radio presets information are most popular among the queried vehicles. This determination may be made by calculating the number of nearby vehicles that have each local radio station stored as a preset and ranking the local radio stations from most popular to least popular. For example, if all ten nearby vehicles have the same preset radio station stored in their audio system, that radio station may be ranked or placed at the top of the list of local radio stations. And if only one of the ten nearby vehicles has a given preset radio station, that station may be ranked at the bottom of the list.

Also in embodiments, if the user preference is to prioritize or sort the list of local radio stations based on genre information associated with the preset radio stations currently stored in a memory of the vehicle (e.g., the preset radio stations data 228 shown in FIG. 2), the processor can be configured to determine which of the radio stations included in the received radio presets information are in the same genre as the existing preset radio stations of the vehicle. This determination may be made by retrieving genre information for each existing preset radio station from the memory, identifying the genres associated with the existing preset radio stations of the vehicle, and comparing those genres to the genre information associated with the local radio stations and included in the radio presets information received from the nearby vehicles or roadside units. For example, if all of the existing preset radio stations are in the country music genre, then the list of local radio stations may be filtered to include only those local radio stations that are country music stations. And if the existing preset radio stations represent a certain variety of genres (for example, rock music stations, news stations, and traffic stations), then the processor may filter out all local radio stations that are not associated with the same genres, such that the list of local radio stations only includes those stations that are associated with the same mixture of genres.

In some embodiments, the user preference is to prioritize the list of local radio stations based on a combination of genre information and popularity. In such cases, the processor can be configured to determine one or more preferred genres based on the existing preset radio stations and also determine which of the local radio stations are most popular within each preferred genre based on the received radio presets information. For example, if the preferred genres are news and pop music, the prioritized list of local radio stations may include the six most popular pop music stations and the six most popular news stations.

In some embodiments, the number of local radio stations included on the list generated at step 306 may vary from vehicle to vehicle depending on the number of memory locations or presets provided by the audio system. For example, if the vehicle audio system has twelve presets for FM radio and six presets for AM radio, the list of local radio stations may include the twelve most popular FM radio stations and the six most popular AM radio stations. In other embodiments, the list of local radio stations may be limited to fewer than the total number of presets. For example, the processor may be configured to store a limited number of local radio stations if the memory is configured to temporarily store the radio stations for as long as the vehicle remains in the corresponding geographical area or broadcast range. In some embodiments, the user can indicate, as part of the user preferences data, how many local radio stations should be saved (e.g., six at a time), and the processor can be configured to automatically save the indicated number of local radio stations, either temporarily or as preset radio stations.

In some embodiments, the method 300 further includes (not shown) the processor storing the local radio stations in the memory locations reserved for radio presets, or otherwise in place of existing preset radio stations. For example, upon generating the list of local radio stations at step 306, the processor may automatically re-program the radio presets with the local radio stations, thus eliminating or minimizing user interaction with the audio system while traveling.

In other embodiments, the method 300 includes (not shown) the processor temporarily storing the location radio stations identified at step 306 in a memory location reserved for carrying out the method 300. For example, the memory may include one or more locations for temporarily storing radio presets information received from other vehicles or infrastructure and/or the list of local radio stations generated at step 306. This memory location may be accessed while carrying out the method 300 and may be cleared once the method 300 ends or at another designated time.

In some embodiments, the method 300 further includes (not shown) the processor presenting the list of location radio stations to the vehicle operator through the user interface, and the user selecting, via the user interface, one or more of the local radio stations for storage in the memory, either temporarily or in place of an existing preset radio station. In such cases, the processor does not override any pre-existing presets without express approval from the vehicle operator.

Referring back to FIG. 3, the method 300 further includes step 308, where the processor causes the vehicle audio system to play audio broadcast by a selected one of the local radio stations. In some cases, the selected local radio station may be a radio station selected by the vehicle operator via the user interface for listening purposes. For example, the user interface may present the list of local radio stations to the vehicle operator, and the operator may select, via the user interface, a desired local radio station. In response, the processor may tune the radio receiver to the selected radio station and begin playing the audio being broadcast by the selected station via the audio system. In other cases, the selected local radio station may be automatically selected by the processor. For example, upon generating the list of local radio stations, the processor may automatically tune the radio receiver to the local radio station listed at the top of the list, and the audio system may automatically being playing the audio being broadcast by that station.

In some embodiments, the method 300 includes (not shown) the processor storing the list of local radio stations in the memory to enable sharing of the stored information in response to a request for radio presets received from another vehicle or roadside unit. For example, referring back to FIG. 1, in such cases, the requesting vehicle 102 becomes one of the nearby vehicles 104. In response to such a request, the processor may send the list of local radio stations and other related data (e.g., the local radio stations data 232) to the requesting vehicle via the wireless transceiver.

In embodiments, the method 300 may include step 310, where the radio receiver detects a low signal strength for at least one of the local radio stations and sends a corresponding notification to the processor. For example, the radio receiver may continuously or periodically measure the signal strength of each local radio station and compare the measured signal strength to a threshold value. If the signal strength measurement drops below the threshold value, the radio receiver may send the notification to the processor. The signal strength of a given radio station may drop below the threshold value once the vehicle travels outside of a broadcast range of the radio station. In some cases, the radio receiver may measure signal quality as well as signal strength and may send a notification to the processor once the signal quality drops below a threshold value.

The method 300 may also include step 312, where in response to receiving the notification sent at step 310, the processor instructs the wireless transceiver to send a new request for radio presets information to any vehicles and/or roadside infrastructure that are currently in close proximity to the vehicle. In some cases, the plurality of currently nearby vehicles may be different from the plurality of nearby vehicles that received the first request for radio presets at step 304. In other cases, one or more vehicles from the initial set of nearby vehicles may also be included in the currently nearby vehicles, for example, if said vehicle(s) have been traveling along the same route as the requesting vehicle. The method 300 may also include (not shown) the wireless transceiver receiving a new set of radio presets information from the currently nearby vehicles and/or roadside units.

As shown in FIG. 3, from step 312, the method 300 may continue back to step 308, where the processor generates a list of local radio stations based on the information received in response to step 312 and the user preference received at step 302. In embodiments, the newly-received information may be used to update or replace the previously-generated list of local radio stations. For example, the processor may replace each local radio station that is no longer within range of the vehicle with a new radio station that is available in the current geographical area and has similar characteristics (e.g., genre and/or popularity), or is otherwise included in the new list generated at step 306. In some embodiments, if the radio receiver is currently tuned to a local radio station that has fading signal strength, the processor may automatically switch over to the new radio station (e.g., by tuning the radio receiver to the radio frequency band of the new station) without waiting for user interaction. In other cases, the processor may wait until a currently-playing song or segment ends before initiating the switch.

In embodiments, the user preferences data may also include settings indicating whether steps 310, 312, and others discussed above may be carried out automatically by the processor, i.e. without user interaction, or whether the processor should request permission, via the user interface, before initiating steps for updating the list of local radio stations. For example, the user preferences data may include settings indicating whether the processor can automatically switch over to newly-acquired local radio stations, or whether express user approval is required before making this change.

The method 300 may end once the vehicle reaches its intended destination or turns off the audio system and/or radio receiver.

In certain embodiments, the process descriptions or blocks in the figures, such as FIG. 3, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle, comprising:
a wireless transceiver for requesting radio presets from a plurality of vehicles within a predetermined proximity of the vehicle;
a processor for generating a list of local radio stations based on radio presets information received by the wireless transceiver and user preference for prioritizing the stations based on popularity of each station among the plurality of vehicles; and
an audio system for playing audio received from a selected one of the stations.

2. The vehicle of claim 1, further comprising:
a radio receiver for wirelessly receiving audio broadcast by the selected local radio station, the radio receiver being operatively coupled to the audio system and the processor.

3. The vehicle of claim 2, wherein:
the radio receiver is further configured to detect a low signal strength for at least one of the local radio stations in response to the vehicle traveling out of a broadcast range of the at least one local radio station; and
the wireless transceiver is further configured to, in response to said detection, send a new request for radio presets information to a second plurality of vehicles within the predetermined proximity of the vehicle.

4. The vehicle of claim 1, further comprising:
a user interface for presenting the list of local radio stations to a user of the vehicle and receiving a user input indicating selection of the selected local radio station, the user interface being operatively coupled to the processor.

5. The vehicle of claim 1, further comprising a memory operatively coupled to the processor and configured to store a plurality of preset radio stations.

6. The vehicle of claim 5, wherein the local radio stations are stored in the memory in place of the plurality of preset radio stations.

7. The vehicle of claim 5, wherein:
the radio presets information received by the wireless transceiver includes radio frequency band and genre information associated with each local radio station; and
the user preference further includes prioritizing the list of local radio stations based on genre information associated with the stored preset radio stations and the genre information associated with the local radio stations.

8. The vehicle of claim 1, further comprising a memory for temporarily storing the list of local radio stations.

9. The vehicle of claim 1, wherein the wireless transceiver is further configured to transmit a request to roadside infrastructure within the predetermined proximity of the vehicle.

10. The vehicle of claim 1, wherein the wireless transceiver transmits a request using dedicated short range communication (DSRC) technology.

11. A method in a vehicle, comprising:
requesting, via a wireless transceiver, radio presets from a plurality of vehicles within predetermined proximity of the vehicle;
generating, using a processor, a list of local radio stations based on radio presets information received by the wireless transceiver and user preference for prioritizing the stations based on station popularity among the plurality of vehicles; and
playing, via an audio system, audio received from a selected one of the stations.

12. The method of claim 11, further comprising wirelessly receiving, via a radio receiver, audio broadcast by the selected local radio station.

13. The method of claim 12, further comprising:
detecting, by the radio receiver, a low signal strength for at least one of the local radio stations in response to the vehicle traveling out of a broadcast range for the at least one local radio station; and
sending, via the wireless transceiver, a new request for radio presets information to a second plurality of vehicles within the predetermined proximity of the vehicle.

14. The method of claim 11, wherein:
the radio presets information includes radio frequency band and genre information associated with each local radio station; and
the user preference further includes prioritizing the list of local radio stations based on genre information associated with a plurality of preset radio stations stored in a memory of the vehicle and the genre information associated with the local radio stations.

15. The method of claim 11, further comprising storing the local radio stations in place of a plurality of preset radio stations stored in a memory of the vehicle.

16. The method of claim 11, further comprising temporarily storing the list of local radio stations in a memory of the vehicle.

17. The method of claim 11, further comprising sending, via the wireless transceiver, a request for radio presets to roadside infrastructure within the predetermined proximity of the vehicle.

18. The method of claim 11, wherein the wireless transceiver sends a request using dedicated short range communication (DSRC) technology.

19. A vehicle, comprising:
- a wireless transceiver for requesting radio presets from a plurality of vehicles within a predetermined proximity of the vehicle;
- a processor for generating a list of local radio stations based on radio presets information received by the wireless transceiver and a user preference for prioritizing the stations based on a popularity of each station among the plurality of vehicles; and
- a radio receiver for detecting a low signal strength for at least one of the local radio stations in response to the vehicle traveling out of a broadcast range of the at least one local radio station,
- wherein in response to said detection, the wireless transceiver sends a new request for radio presets information to a second plurality of vehicles within the predetermined proximity of the vehicle.

20. The vehicle of claim 19, further comprising an audio system for playing audio received from a selected one of the local radio stations, wherein the radio receiver wirelessly receives audio broadcast by the selected one of the local radio stations.

* * * * *